Oct. 25, 1960     W. J. BROCKMAN     2,957,451
ATTACHMENT FOR A MILKING STALL
Filed Sept. 29, 1958
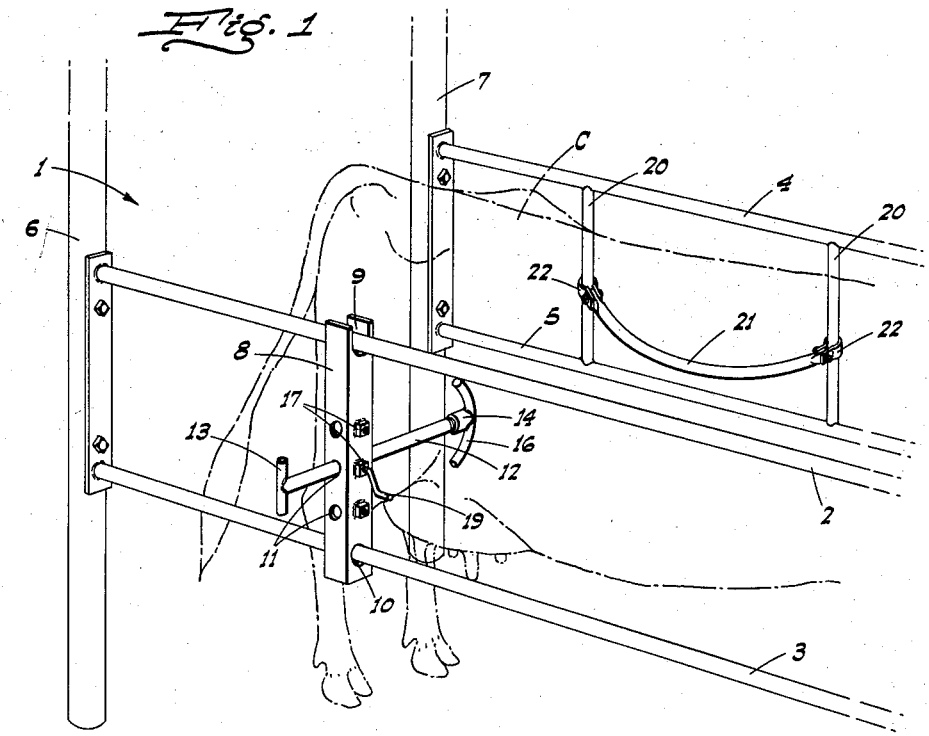
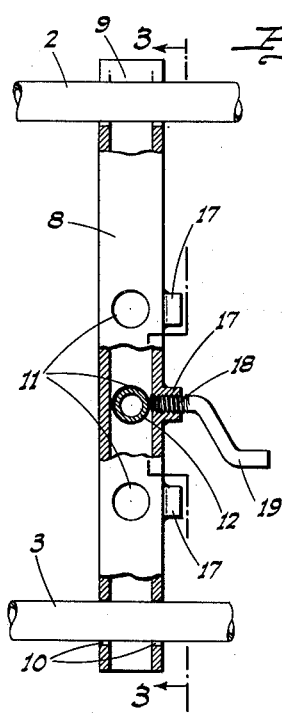
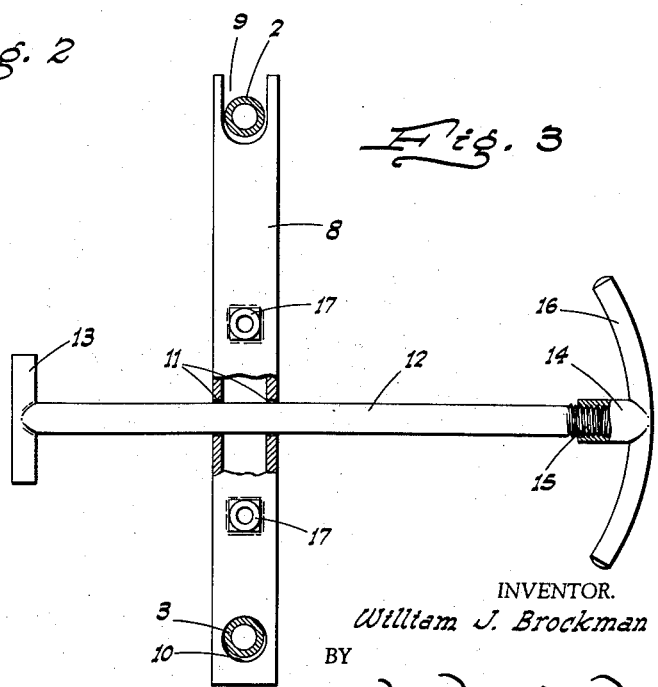
INVENTOR.
William J. Brockman
BY
Webster & Webster
ATTYS.

United States Patent Office 2,957,451
Patented Oct. 25, 1960

2,957,451

ATTACHMENT FOR A MILKING STALL

William J. Brockman, Rte. 5, Box 162, Porterville, Calif.

Filed Sept. 29, 1958, Ser. No. 764,152

6 Claims. (Cl. 119—96)

This invention relates in general to an attachment for a stall or stanchion in which a cow is placed for milking.

In particular the invention is directed to, and it is a major object to provide, an attachment—for a milking stall—which is adapted to engage the cow in a manner to encourage the animal to be gentle and to stand quiescent during the milking operation.

Another important object of the invention is to provide an attachment, for the purpose described, which includes a presser head arranged to engage a flank of the cow in the stall; such presser head being secured in connection with one side of the stall by a novel, manually adjustable mount.

An additional object of the invention is to provide the stall, on the other side, with a stand-off member which prevents the cow from side stepping in the stall away from the flank-engaging presser head.

It is also an object of the invention to provide an attachment, for a milking stall, which is designed for ease and economy of manufacture, ready installation, and convenience of use.

Still another object of the invention is to provide a practical, reliable, and durable attachment, for a milking stall, which will be exceedingly effective for the purpose for which it is designed.

These objects are accomplished by means of such structure and relative arrangement of parts as will fully appear by a perusal of the following specification and claims.

In the drawings:

Fig. 1 is a perspective view of the attachment as mounted in connection with a stall.

Fig. 2 is an enlarged fragmentary outer side elevation, partly broken away and partly in section, showing the assembly of the mounting bar, presser head shaft, and related parts.

Fig. 3 is a transverse vertical sectional elevation taken on line 3—3 of Fig. 2.

Referring now more particularly to the drawings, and to the characters of reference marked thereon, the attachment is here shown as mounted in connection with a milking stall, indicated generally at 1, and which stall is defined—on one side—by an upper rail 2 and a lower rail 3, and on the other side by an upper rail 4 and a lower rail 5. The rails which define the sides of the stall 1 are suitably supported in connection with end posts, two of which are indicated at 6 and 7, respectively.

The stall 1 is of single-occupancy type, and a cow, indicated diagrammatically at C, is placed in such stall for the milking operation. In order to cause the cow to stand quiescent in the stall during the milking operation I provide the following attachment, which comprises the present invention.

A vertical mounting bar 8 extends between the upper rail 2 and lower rail 3, and is slidably supported thereon; this being accomplished by providing the bar 8 with the upper end notch or cradle 9 through which the upper rail 2 extends, and lower end, alined bores 10 through which the lower rail 3 passes. As so supported, the mounting bar 8 is slidable back and forth on the rails 2 and 3, to the end that such bar may be disposed in transverse alinement with the adjacent flank of the cow C in stall 1.

The mounting bar 8 is formed with a vertical row of transversely alined bores 11, through any selected pair of which a horizontal transverse shaft 12 slidably extends intermediate its ends. At its outer end the shaft 12 is provided with a rigid cross handle 13, while at its inner end said shaft is fitted with an end cap 14 removably threaded onto said shaft, as at 15.

The mounting bar 8, which is of metal construction, is preferably of rectangular form in cross section and hollow, as shown in Fig. 2, for the sake of lightness. If, however, the bar is made solid, then the different pairs of bores 10 and 11 would of course be each replaced by a single bore through the bar.

The end cap 14 is fixed to an arcuate presser head 16 centrally of the ends of the latter and on the concave side; shaft 12 thus forming the supporting element for the presser head. As so attached to the end cap 14 the presser head 16 is convex on its inner side; i.e., on the side adjacent the cow C.

By reason of the removability of the end cap 14 it may be detached from the shaft 12 when it is desired to relocate said shaft in a different pair of the alined bores 11, and as may be necessitated by the height of the cow C in the stall 1.

A vertical row of nuts 17 is fixed to the face of the mounting bar 8, which extends parallel to the axis of the bores 11; such nuts corresponding to—and being in the same horizontal plane as—each pair of the alined bores 11.

A set screw 18, provided with a hand crank 19, is adapted to be run into any one of the nuts 17, and to then bear in releasable but locking relation against the shaft 12 when it extends through the related alined bores 11.

After the cow is placed in the stall 1, the vertical mounting bar 8 is shifted along the rails 2 and 3 until said bar is transversely alined with the cow's flank. Thereafter, the shaft 12 is inserted through the selected pair of alined bores 11 and the end cap 14 is threaded onto the inner end of said shaft.

Nextly, the shaft 12 is shifted laterally inwardly by the cross handle 13 until the arcuate presser head 16 bears relatively forcefully against the cow's flank, and at which time it is preferred that said presser head 16 occupies a vertical position.

Finally, the shaft 12 is releasably locked to the mounting bar by running the set screw 18 through the appropriate nut 17.

With the presser head 16 relatively forcefully bearing against the cow's flank, the cow stands quiescent and gentle during the subsequent milking operation. It is a well known fact that pressure applied to a cow's flank produces the desired effect.

In order to prevent the cow, especially a small one, from side stepping away from the presser head 16 when the latter is in operative or flank-engaging position, I provide the following:

On the side of the stall 1 opposite that to which the presser head 16 is secured, a pair of longitudinally spaced, vertical spanner posts 20 are connected between the upper rail 4 and lower rail 5. A horizontal, laterally inwardly curved, stand-off bow 21 is connected at its ends to the adjacent spanner posts 20, intermediate the ends of the latter, by means of clamps 22.

The stand-off bow 21 is disposed in general opposition to the presser head 16, and serves to engage the side of the cow opposite said presser head; thus preventing the cow from stepping away from the latter.

From the foregoing description it will be readily seen that there has been produced such a device as will fully fulfill the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An attachment for a cow milking stall having transversely spaced sides disposed a fixed distance apart and one of which includes longitudinal vertically spaced rails, the attachment comprising a vertical bar extending between the rails intermediate their ends, a shaft extending transversely inward of the stall from and supported by the bar, a presser head of elongated and convexly curved form in a vertical plane transversely of the stall secured on the inner end of the shaft and adapted for engagement by the flank of a cow in the stall, and means mounting the bar on the rails for sliding movement along the same.

2. An attachment for a cow milking stall having transversely spaced sides disposed a fixed distance apart and one of which includes longitudinal vertically spaced rails, the attachment comprising a vertical bar extending between and supported by the rails intermediate their ends, a vertically extending relatively short presser head in the stall and adapted for engagement by the flank of a cow in the stall, and means supporting the presser head from the bar for independent adjustment relative thereto both vertically and transversely of the stall selectively.

3. An attachment for a cow milking stall having transversely spaced sides disposed a fixed distance apart and one of which includes longitudinal vertically spaced rails, the attachment comprising a vertical bar extending between and supported by the rails intermediate their ends, a presser head in the stall and adapted for engagement by the flank of a cow in the stall, and means supporting the presser head from the bar for adjustment relative thereto both vertically and transversely of the stall selectively; said means comprising a shaft on one end of which the presser head is mounted; the bar having a vertical transverse row of bores through any one at a time of which the shaft slidably projects, and clamping means associated with the bar and said bore to releasably hold the shaft in any selected position relative to the bar.

4. An attachment for a cow milking stall having transversely spaced sides disposed a fixed distance apart and one of which includes longitudinal vertically spaced rails, the attachment comprising a vertical bar extending between and supported by the rails intermediate their ends, a presser head in the stall and adapted for engagement by the flank of a cow in the stall, the bar having a vertical row of transversely extending bores, a shaft slidable through any selected one of the bores and projecting into the stall, an enlarged handle on the outer end of the shaft, and a cap rigid with the presser head intermediate its ends removably mounted on the inner end of the shaft.

5. An attachment, as in claim 1, with a standoff element within the stall comprising an elongated horizontal curved bow mounted in laterally immovable connection with the other side of the stall directly opposite and at the level of the presser head.

6. An attachment, as in claim 2, with a horizontally extending stand-off element within the stall opposite the presser head, and means mounting said element in connection with the other side of the stall for vertical adjustment independently of the adjustment of the presser head.

References Cited in the file of this patent

UNITED STATES PATENTS

| | | |
|---|---|---|
| 1,195,419 | Trim | Aug. 22, 1916 |
| 1,621,760 | Stader et al. | Mar. 22, 1927 |
| 2,729,196 | Breitenbach | Jan. 3, 1956 |
| 2,904,005 | Mielke et al. | Sept. 15, 1959 |